United States Patent
Atkinson et al.

(10) Patent No.: US 10,747,285 B2
(45) Date of Patent: Aug. 18, 2020

(54) PROVIDE BOUNDED VOLTAGE RANGE

(71) Applicant: HEWLETT-PACKARD DEVELOPMENT COMPANY, L.P., Houston, TX (US)

(72) Inventors: Lee Atkinson, Taipei (TW); Chin-Ho Li, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/067,699

(22) PCT Filed: Mar. 17, 2016

(86) PCT No.: PCT/US2016/022937
§ 371 (c)(1),
(2) Date: Jul. 2, 2018

(87) PCT Pub. No.: WO2017/160298
PCT Pub. Date: Sep. 21, 2017

(65) Prior Publication Data
US 2019/0011969 A1  Jan. 10, 2019

(51) Int. Cl.
*G06F 1/26* (2006.01)
*H02J 7/00* (2006.01)
*H02J 7/34* (2006.01)

(52) U.S. Cl.
CPC ............ *G06F 1/266* (2013.01); *H02J 7/0047* (2013.01); *H02J 7/0063* (2013.01); *H02J 7/00* (2013.01); *H02J 7/00306* (2020.01); *H02J 7/342* (2020.01); *H02J 2007/0067* (2013.01); *H02J 2207/20* (2020.01)

(58) Field of Classification Search
CPC .............................. G06F 1/266; G06F 1/3212
See application file for complete search history.

(56) References Cited

U.S. PATENT DOCUMENTS

| | | | |
|---|---|---|---|
| 5,764,031 A | 6/1998 | Mishima | |
| 7,624,202 B2 * | 11/2009 | Monks | G06F 1/266 710/15 |
| 7,671,559 B2 | 3/2010 | Ludtke | |
| 7,982,435 B2 * | 7/2011 | Masuda | B60W 10/24 320/136 |

(Continued)

FOREIGN PATENT DOCUMENTS

| | | |
|---|---|---|
| EP | 1531535 | 11/2004 |
| EP | 2654176 A1 | 10/2013 |

(Continued)

OTHER PUBLICATIONS

"On-The-Go Supplement to the USB 2.0 Specification" Revision 1.0a, Jun. 24, 2003; 77 Pages (Year: 2003).*

(Continued)

*Primary Examiner* — Brian T Misiura
(74) *Attorney, Agent, or Firm* — HPI Patent Department

(57) ABSTRACT

Examples disclosed herein relate to a device to provide a bounded voltage range. Examples include a device to acquire a request for a voltage from a sink. In examples, the device determines whether the voltage is to be supplied from a battery of a source. The device is to further determine a bounded voltage range to supply to the sink according to the request for voltage and a state of the battery.

15 Claims, 4 Drawing Sheets

(56) References Cited

U.S. PATENT DOCUMENTS

| | | | |
|---|---|---|---|
| 8,035,368 B2 * | 10/2011 | May | G06F 1/266 323/318 |
| 8,084,987 B2 * | 12/2011 | Hurtz | G06F 1/3203 320/103 |
| 8,898,485 B2 * | 11/2014 | Scott | G06F 1/266 713/300 |
| 8,898,492 B2 * | 11/2014 | Sha | H02J 7/0004 713/300 |
| 8,909,951 B2 * | 12/2014 | Lin | G06F 1/266 713/300 |
| 9,153,995 B2 | 10/2015 | Walley et al. | |
| 9,651,956 B2 * | 5/2017 | Park | H04B 1/1607 |
| 9,654,857 B2 * | 5/2017 | Park | H04R 1/1025 |
| 9,917,462 B2 * | 3/2018 | Won | G06F 1/266 |
| 9,935,477 B2 * | 4/2018 | Araki | H01M 10/44 |
| 9,946,317 B2 * | 4/2018 | Backman | G06F 1/266 |
| 9,997,933 B2 * | 6/2018 | Huang | H02J 7/0055 |
| 10,088,884 B2 * | 10/2018 | Jaramillo | G06F 1/266 |
| 2009/0115252 A1 | 5/2009 | Caraghiorghiopol et al. | |
| 2012/0212183 A1 | 8/2012 | Yamada et al. | |
| 2014/0300311 A1 | 10/2014 | Caren et al. | |
| 2015/0194825 A1 | 7/2015 | Ma | |
| 2016/0062441 A1 * | 3/2016 | Chou | G06F 1/3212 713/320 |
| 2016/0064977 A1 | 3/2016 | Chen et al. | |

FOREIGN PATENT DOCUMENTS

| | | |
|---|---|---|
| EP | 2947542 | 5/2015 |
| JP | 2007-327337 A | 12/2007 |
| WO | WO 2015069534 | 5/2015 |

OTHER PUBLICATIONS

Eichi, H.R. et al, "Adaptive Parameter Identification and State-of-charge Estimation of Lithium-ion Batteries", Oct. 25-28, 2012.

Intel Corporation. Smart Battery Selector Specifications. Smart Battery Selector Specification. Revision 1.0. Sep. 5, 1996.

Intel Corporation. Smart Battery System Specifications. SmartBattery Data Specification. Revision 1.0 Feb. 15, 1995.

Intel Corporation. Universal Serial Bus Power Delivery Specification. Revision 2.0, V1.1 May 7, 2015.

* cited by examiner

PROVIDE BOUNDED VOLTAGE RANGE

BACKGROUND

Many devices operate on battery power. Maintaining power in battery operated devices is an important concern for users. In some examples, a user may decide to transfer power from one battery operated devices to another device. For example, a notebook computer may be used to charge a mobile phone.

BRIEF DESCRIPTION OF THE DRAWINGS

The following detailed description references the drawings, wherein.

DETAILED DESCRIPTION

In the following discussion and in the claims, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "approximately" as used herein to modify a value is intended to be determined based on the understanding of one of ordinary skill in the art, and can, for example, mean plus or minus up to 20% of that value.

There are a number of battery operated devices (i.e., a source) which may provide power to another device (i.e., a sink), such as a computer, a mobile phone, a tablet computer, etc. The power parameters (e.g., voltage and current) supplied by such a battery operated device may not be suitable for a sink receiving the power. For example, the source may need to convert a voltage to a higher or lower voltage. In other examples, the sink may require a fixed voltage over time. However, the battery operated source may not be able to provide such a fixed voltage as its battery discharges over time. There is a need to provide voltage to a sink which is consistent over time to avoid damaging the sink or the battery operated source. Various negotiation mechanisms have been developed to allow a sink to communicate its power parameters (e.g., voltage and current) to the source so that the source can configure its output power parameters to meet the sink's power parameters. However, such configuration of the output power parameters may not be consistent over time.

To address these issues, in the examples described herein, a battery operated device is described which provides a bounded voltage range to a sink. The bounded voltage range is a voltage that falls within and including a determined minimum voltage value and maximum voltage value. A controller of the device determines the bounded voltage range based on a voltage state of the battery of the device and the power parameters requested by a sink. In some examples, if the voltage state of the device is outside the bounded voltage range, the battery operated device may convert the output voltage of the battery to be within the bounded voltage range. In some examples, the controller may also alter the reported voltage state of the battery based on the bounded voltage range.

Figure 1:
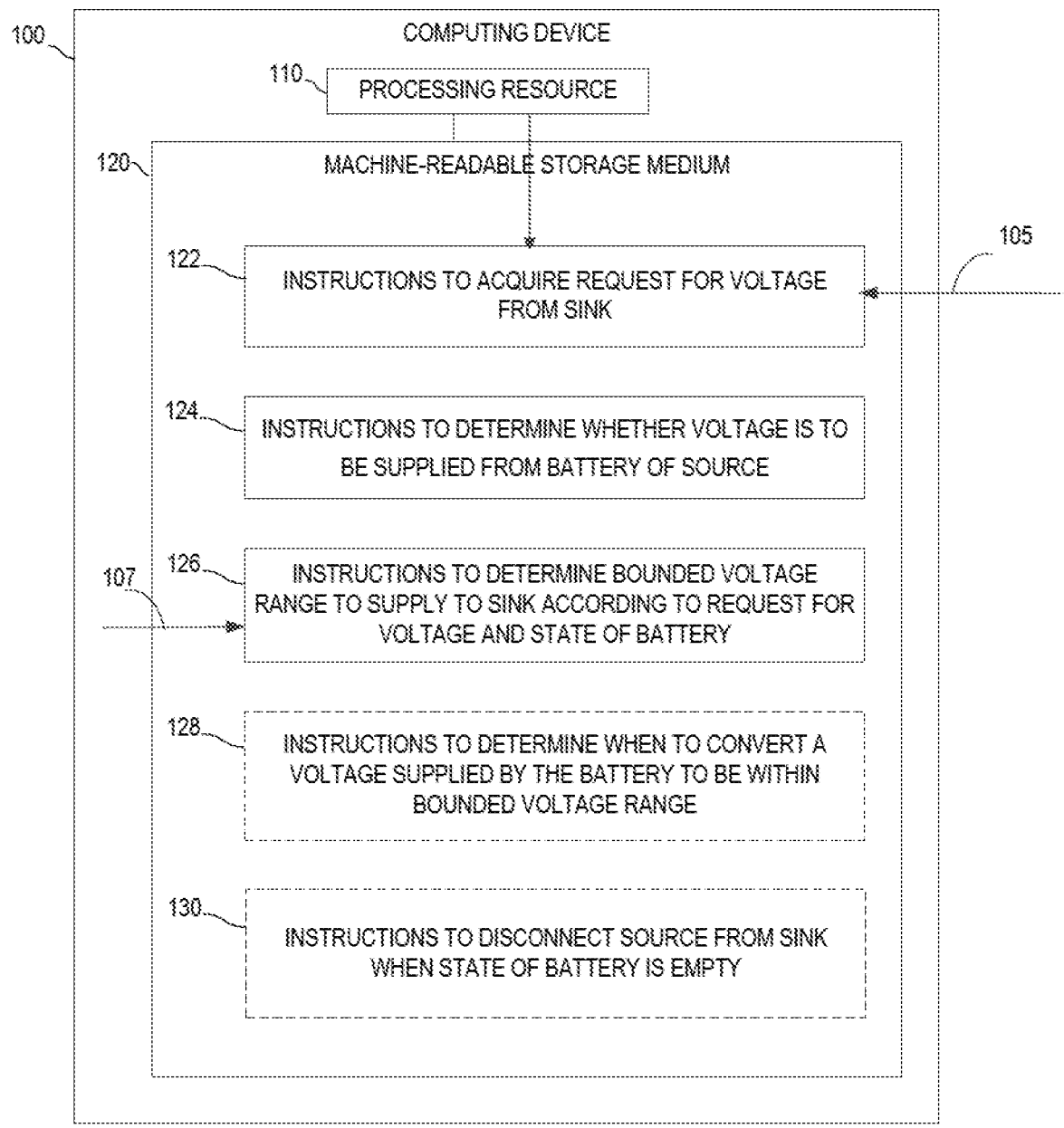
FIG. 1 is a block diagram of an example computing device to provide voltage.

Referring now to the drawings, FIG. 1 is a block diagram of an example computing device 100 to provide voltage. A "computing device" or "device" may be a desktop computer, laptop (or notebook) computer, workstation, tablet computer, mobile phone, smart phone, smart device, or any other processing device or equipment which may be used to provide power to another device. In the example of FIG. 1, computing device 100 includes a processing resource 110 and a machine readable storage medium 120 comprising (e.g., encoded with) instructions 122, 124, 126, 128, and 130 executable by processing resource 110. In some examples, storage medium 120 may include additional instructions. In some examples, instructions 122, 124, 126, 128, 130, and any other instructions described herein in relation to storage medium 120, may be stored on a machine-readable storage medium remote from but accessible to computing device 100 and processing resource 110 (e.g., via a computer network). In some examples, instructions 122, 124, 126, 128, and 130 may be instructions of a computer program, computer application (app), agent, or the like, of computing device 100. In other examples, the functionalities described herein in relation to instructions 122, 124, 126, 128, and 130 may be implemented as engines comprising any combination of hardware and programming to implement the functionalities of the engines, as described below.

In examples described herein, a processing resource may include, for example, one processor or multiple processors included in a single computing device (as shown in FIG. 1) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may acquire a request for voltage 105 from a sink. Computing device 100 may passively acquire (i.e., receive) or actively acquire (e.g., retrieve) in computing device 100 a request for voltage 105 from a device (hereinafter referred to as the "sink"). In such an example, the computing device 100 may acquire the request for voltage 105 from the sink either coupled to computing device 100 directly (e.g., wired) or indirectly (e.g., wirelessly). In examples, request for voltage 105 may include one or more power parameters of the sink such as a voltage range and current range which the sink can accept.

In instructions 124, computing device 100 may determine whether the voltage is to be supplied from a battery of a source. In examples described herein, the source may be any device configured to provide power to another device. In some examples, the source may be computing device 100 or a device coupled thereto. In an example, the source may be operating on battery power when computing device 100 determines to provide voltage to the sink. In other examples, the source may be operating via a direct power source (e.g., a wall receptacle) when computing device 100 determines to provide voltage to the sink.

In instruction 126, computing device 100 may determine a bounded voltage range to be supplied to the sink according to the request for voltage 105 and a voltage state 107 of the battery. As used herein, a "bounded voltage range" refers to a range of voltages within and including a minimum voltage value and maximum voltage value determined according to another parameter. In such examples, to provide a bounded voltage range is to provide a voltage which is within the bounded voltage range. In some examples, the provided voltage may vary over time. However, the examples are not limited thereto, and the voltage provided as the bounded voltage range may remain approximately constant over time. In some examples, the bounded voltage range may be negotiated with the sink. In such examples, the sink may communicate with the source to determine the bounded voltage range. In examples, the voltage state 107 of the battery may be an indication of the voltage level of the battery of the source including for example an empty state to indicate the battery has reached an empty state. In some examples, a processing resource 110 may directly or indirectly monitor the battery of the source to determine the voltage state of the battery. For example, the voltage state 107 of the battery may be provided by a fuel gauge monitoring the battery of computing device 100.

In some examples, in instructions 128, computing device 100 may determine when to convert a voltage supplied by the battery to be within the bounded voltage range. In such examples, computing device 100 may convert a voltage supplied by the battery to be within the bounded voltage range if the voltage is above the maximum voltage value of the bounded voltage range. In such an example, a buck converter may decrease the voltage of the battery to be within the bounded voltage range. In other examples, computing device 100 may convert a voltage supplied by the battery to be within the bounded voltage range if the voltage is below the minimum voltage value of the bounded voltage range. In such an example, a boost converter may decrease the voltage of the battery to be within the bounded voltage range.

In some examples, in instructions 130, computing device 100 may disconnect the source from the sink when the voltage state of the battery is empty. In some examples, the empty state may be set according to power parameters of the source to be a minimum voltage value on which the source may continue to operate without damaging the source. For example, the empty state may refer to a voltage value of the battery which can sustain certain features of the source (e.g., a clock, a memory, a fan, etc.).

In some examples, instructions 122, 124, 126, 128, and 130 may be part of an installation package that, when installed, may be executed by processing resource 110 to implement the functionalities described herein in relation to instructions 122, 124, 126, 128, and 130. In such examples, storage medium 120 may be a portable medium, such as a CD, DVD, flash drive, or a memory maintained by a computing device from which the installation package can be downloaded and installed. In other examples, instructions 122, 124, 126, 128, and 130 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-6.

Figure 2:
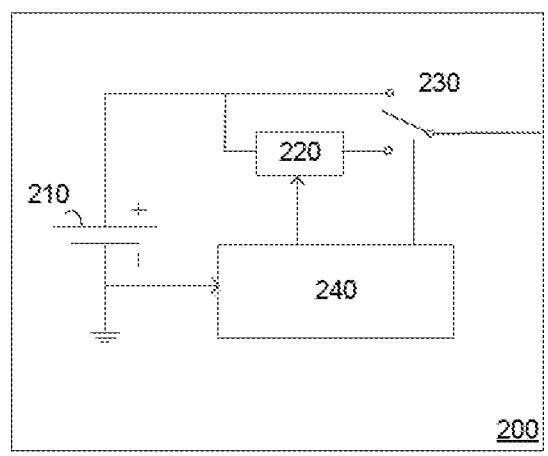
FIG. 2 is a diagram of a device to provide voltage according to an example.
Figure 3:
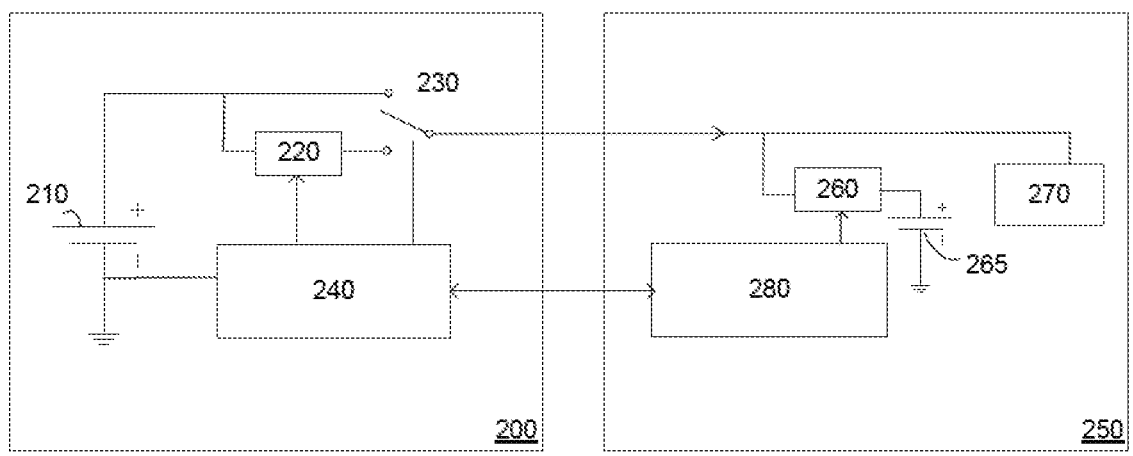
FIG. 3 is a diagram of a system to provide voltage according to an example.

FIG. 2 is a diagram of a device 200 according to an example. In the example of FIG. 2, device 200 includes a battery 210, a converter 220, and a controller 240. In examples, device 200 may also include a switch 230. FIG. 3 is a diagram of a system 30 to provide voltage according to an example. In the example of FIG. 3, system 30 includes device 200 configured as a source and coupled to a device 250 configured as a sink. In examples, device 200 may be coupled to device 250 via a bus and switch 230. In some examples, the bus may be a Universal Serial Bus (USB), such as, USB 1.x, USB 2.0, USB 3.0, USB 3.1, and USB Type-C, etc. In an example, device 250 includes a battery charger 260, a battery 265, a load 270, and a controller 280. In the example of FIG. 3, device 200 may be configured to provide voltage from battery 210 to load 270 and/or battery 265.

In examples, battery 210 may be any type of battery to provide voltage. In some examples, battery 210 may include a number of cells to provide power. In such examples, the cells of battery 210 may be arranged in series or in parallel. In some examples, cells of battery 210 may be able to switch between series and parallel arrangements to provide a specific voltage from battery 210. In the example of FIG. 3, battery 210 may discharge over time as it is used by device 200 or provided to device 250. In examples, a voltage state of battery 210 may be provided to controller 240. In some examples, an empty state of battery 210 may be a voltage state at which battery 210 ceases to provide power to a load coupled thereto (e.g., device 250). In such an example, battery 210 may continue to provide power to some components of device 200 after discontinuing to provide voltage to the load. For example, where device 200 is a notebook computer, an empty state of the battery may result in shutting down power to a display screen of the notebook computer while continuing to provide power to a fan to cool the notebook computer. In some examples, the empty state of battery 210 may be altered according to the load coupled thereto and a voltage state of the battery.

In examples, converter 220 may be any hardware or programming in combination with hardware to convert a voltage provided by battery 210. In some examples, converter 220 may be a direct current (DC)-to-DC converter to convert the voltage provided by battery 210 into direct current of a different voltage. In such examples, converter 220 may operate as a buck converter or in buck mode to decrease the voltage provided by battery 210 to a lower voltage. In other examples, converter 220 may operate as a boost converter or in boost mode to increase a voltage provided by battery 210 to a higher voltage. In some examples, converter 220 may alternate between operating in a buck mode or a boost mode. In some examples, converter 220 may be a DC-to-alternating current (AC) converter to convert the voltage provided by battery 210 into alternating current.

In examples, controller 240 may be any hardware or programming in combination with hardware to acquire a request for voltage from a sink and to determine a bounded voltage range to be provided to the sink according to the request for voltage and a voltage state of battery 210. In the example of FIG. 3, controller 240 may acquire a request for voltage from device 250 via the bus and switch 230. In such an example, controller 240 may communicate with controller 280 of device 250 via a communication line to acquire the request for voltage. In examples, the request for voltage may include power parameters, such as voltage and current, to provide power to load 270 and/or battery 265.

In examples, controller 240 may determine the bounded voltage range according to the request for voltage and a voltage state of battery 210. In an example, the voltage request from device 250 may include a request for a range of voltage to recharge battery 265 and/or provide power to load 270. In such an example, controller 240 may determine the bounded voltage range is a subset of the requested range of voltage. For examples, controller 280 may request voltage in a range from 12V-17.2V from device 200 and controller 240 may determine the bounded voltage range is 13.5V-15.5V based on a voltage state of battery 210. In other examples, device 200 may communicate its power supply to device 250 and in response receive a request for voltage within a certain range. In such an example, controller 240 may determine the bounded voltage range is the range of voltage requested by device 250. In examples, controller 240 may control converter 220 to convert output voltage from battery 210 to be within the bounded voltage range.

Figure 4:
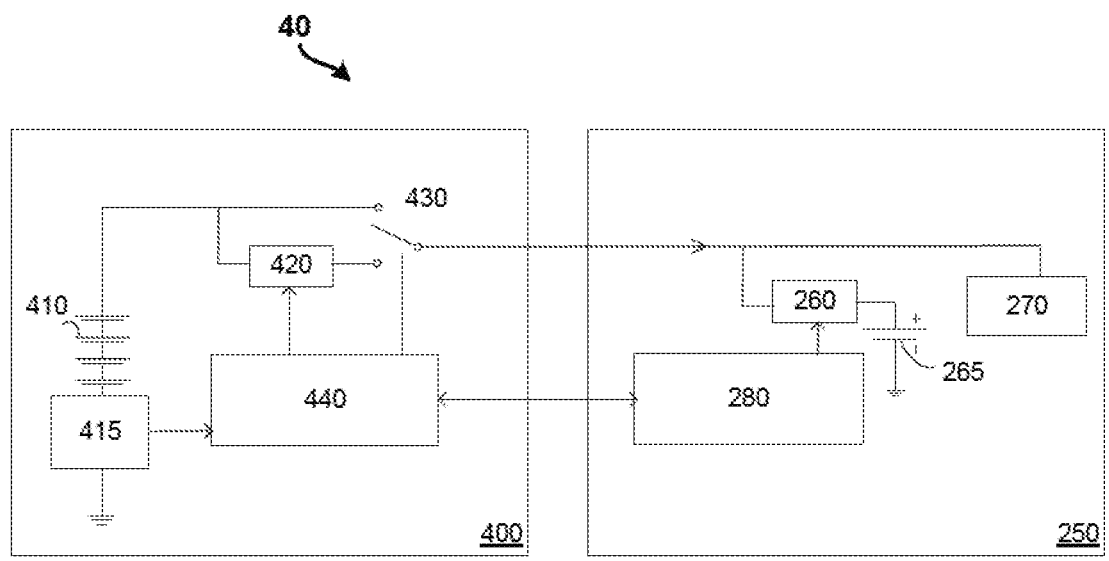
FIG. 4 is a diagram of a system to provide voltage according to an example.

FIG. 4 is a diagram of a system 40 to provide voltage according to an example. In the example of FIG. 4, system 40 includes a device 400 configured as a source and coupled to device 250 configured as a sink. In examples, device 400 includes fuel cells 410, a fuel gauge 415, a switch 430, a converter 420, and a controller 440. In the example of FIG. 4, similarly numbered elements are substantially similar to elements described above with respect to FIGS. 2-3.

In examples, fuel gauge 415 may be any hardware or programming in combination with hardware to monitor fuel cells 410 and provide the voltage state information of fuels cells 410 to controller 440. In such an example, fuel gauge 415 may provide an empty state indicator to controller 440. In such an example, controller 440 may control switch 430 to disconnect device 250 and cease providing voltage thereto in response to receiving the empty state indicator. In some examples, controller 440 may communicate with fuel gauge 415 to alter the empty state indicator according to the bounded voltage range determined by controller 440. In such an example, controller 440 may determine the empty state should be set at a different voltage level of fuel cells 410.

In the examples of FIGS. 3-4, device 250 may receive the bounded voltage range and provide the bounded voltage range to the load 270 and/or to charge battery 265 via a battery charger 260. In examples, load 270 may be any electrical load of a device. In examples, battery 265 may be any battery to be recharged by a voltage received in device 250. In some examples, a battery charger 260 may provide the bounded voltage range to battery 265 in a suitable manner. For examples, battery charger 260 may step up or step down the voltage or current of the bounded voltage range to be compatible with battery 265.

Figure 5:
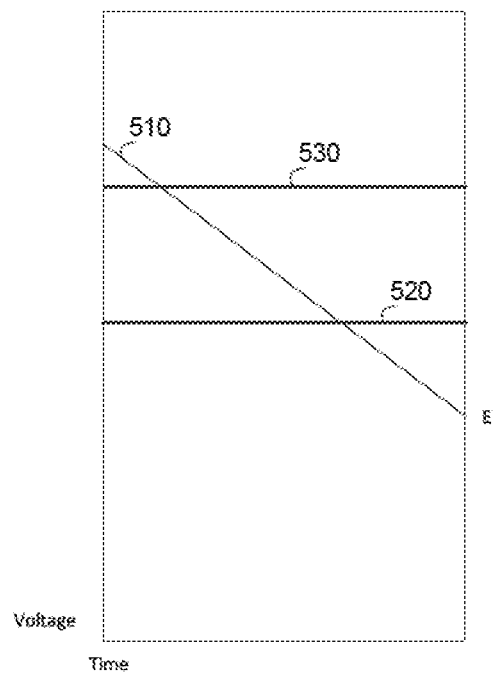
FIG. 5 is a diagram of a voltage supply according to an example.

FIG. 5 is a diagram of a voltage supply according to an example. FIG. 5 illustrates the voltage of battery 210 or fuel cells 410 as voltage is provided to a sink (e.g., device 250). Curve 510 illustrates the voltage state of battery 210 or fuel cells 410 as a function of time. Curve 520 represents the minimum voltage value of the bounded voltage range determined by controller 240 or controller 440. Curve 530 represents the maximum voltage value of the bounded voltage range determined by controller 240 or controller 440. In the example of FIG. 5, converter 220 or converter 420 may operate in buck mode to decrease the output voltage of battery 210 or fuel cells 410, respectively, to be lower than maximum voltage value when curve 510 is above curve 530. Similarly, converter 220 or converter 420 may operate in boost mode to increase the output voltage of battery 210 or fuel cells 410, respectively, to be higher than minimum voltage value when curve 510 is below curve 520. In the example of FIG. 5, the empty state of battery 210 or fuel cells 410 is represented by voltage E. In examples, when the voltage level of battery 210 or fuel cells 410 reaches the empty state, device 200 or device 400 may cease providing the bounded voltage range to the sink (e.g., device 250).

Although depicted as a straight lines, it will be understood that the minimum voltage value may differ over time and curve 520 may have a different value over time. Similarly, although depicted as a straight lines, it will be understood that the maximum voltage value may differ over time and curve 520 may have a different value over time. In such examples, it will be understood that the bounded voltage range may fluctuate over time.

Figure 6:
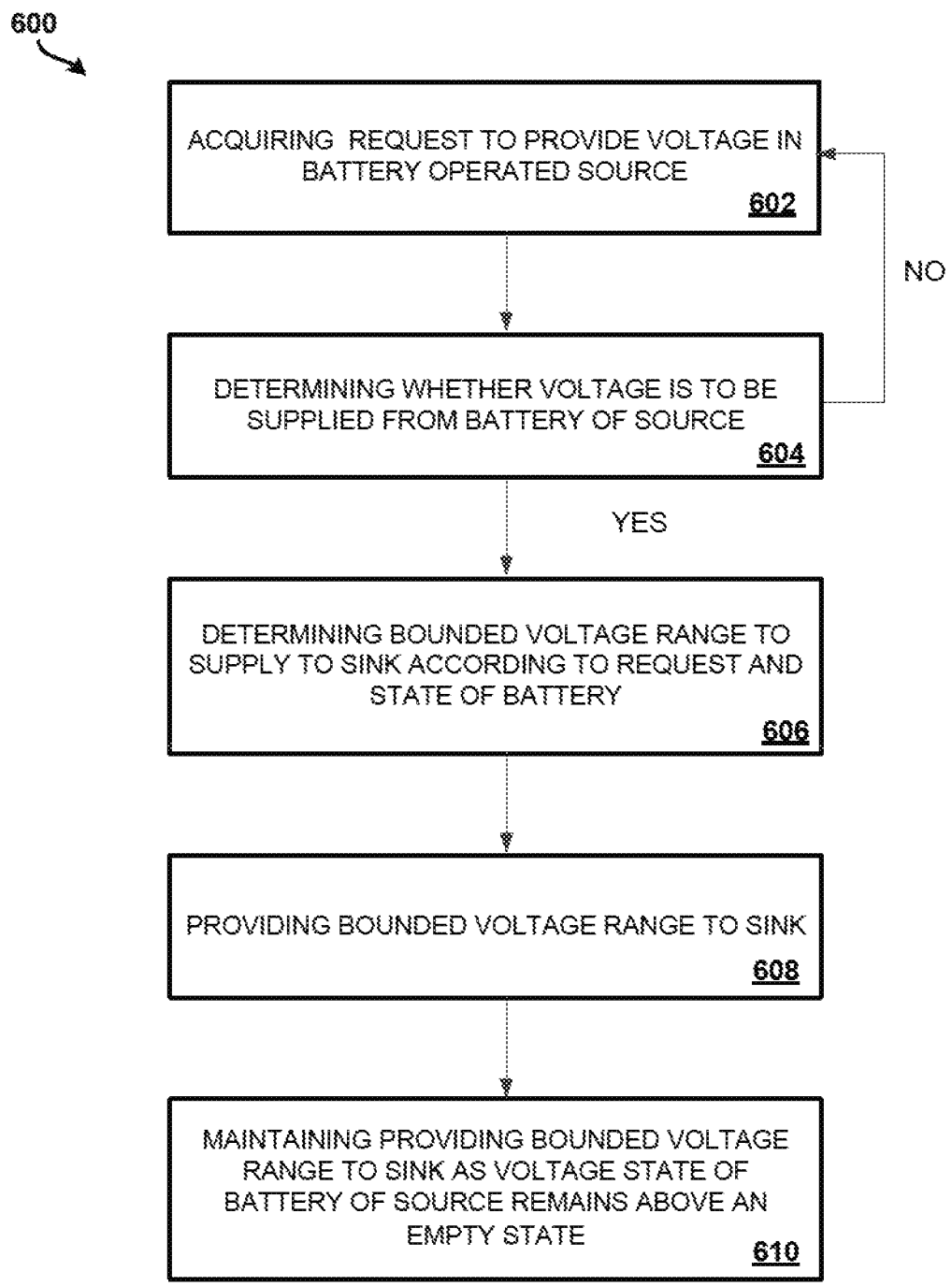
FIG. 6 is a flow diagram illustrating an example of a method for providing power.

FIG. 6 is a flowchart of an example method 600 for providing power. Although execution of method 600 is described below with reference to computing device 200 described above, other suitable devices (device 400) for the execution of method 600 can be utilized. Additionally, implementation of method 600 is not limited to such examples.

At 602 of method 600, controller 240 may acquire a request to provide voltage. In examples, the request to provide voltage may include power parameters of device 250.

At 604, controller 240 may determine whether the voltage is to be supplied from battery 210.

At 606, controller 240 may determining a bounded voltage range to supply to a sink (e.g., device 250) according to the request to provide voltage and a voltage state of battery 210.

At 608, device 200 may provide the bounded voltage range to the sink. In examples, converter 220 may covert a voltage output from battery 210 to be within the bounded voltage range according to a voltage state of battery 210. As illustrated with respect to FIG. 5, converter 220 may operate in a boost mode to increase the output voltage of battery 210 to be within the bounded voltage range when curve 510 is below the minimum voltage value illustrated by curve 520. In other examples, converter 220 may operate in a buck mode to decrease the output voltage of battery 210 to be within the bounded voltage range when curve 510 is above the maximum voltage value illustrated by curve 530.

At 610, device 200 may maintain providing the bounded voltage range to the sink (e.g., device 250) as the voltage state of battery 210 remains above an empty state. In examples, the empty state may be determined and altered by the controller 240 according to the voltage state of battery 210 and the bounded voltage range.

Although the flowchart of FIG. 6 shows a specific order of performance of certain functionalities, method 600 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-5.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other Implementations described herein.

What is claimed is:

1. A non-transitory machine-readable storage medium comprising instructions executable by a processing resource to:
    acquire a request for a voltage from a sink;
    determine whether the voltage is to be supplied from a battery of a source; and
    determine a bounded voltage range to supply to the sink according to the request for voltage and a state of the battery, wherein the bounded voltage range comprises a maximum voltage value and a minimum voltage value to supply the sink determined based on an amount of discharge of the battery over a period of time.

2. The storage medium of claim 1, further comprising to determine when to convert a voltage supplied by the battery to be within the bounded voltage range.

3. The storage medium of claim 2, further comprising to disconnect the source from the sink when the state of the battery is empty.

4. The storage medium of claim 1, wherein the bounded voltage range is negotiated with the sink.

5. The storage medium of claim 1, wherein the bounded voltage range is a subset of a range of voltage requested by the sink.

6. A device to provide voltage, comprising:
    a battery to provide voltage;
    a controller to acquire a request for voltage from a sink and to determine a bounded voltage range to be provided to the sink according to the request for voltage and a voltage state of the battery, wherein the bounded voltage range comprises a maximum voltage value and a minimum voltage value to supply the sink determined based on an amount of discharge of the battery over a period of time; and
    a converter to convert the voltage from the battery to be a bounded voltage range when the device is operating on battery power.

7. The device of claim 6, wherein the controller is to determine an empty state of the battery according to bounded voltage range and the device is to cease providing power when the battery reaches the empty state.

8. The device of claim 6, further comprising:
    a fuel gauge to determine the voltage state of the battery and to provide an empty state indication to the controller,
    wherein the controller is to adjust the empty state of the battery according to the bounded voltage range.

9. The device of claim 6, wherein the converter is a buck converter to decrease the voltage of the battery to provide the bounded voltage range to the sink.

10. The device of claim 6, wherein the converter is a boost converter to increase the voltage of the battery to provide the bounded voltage range to the sink.

11. The device of claim 6, wherein the bounded voltage range is negotiated with the sink.

12. The device of claim 11, wherein the bounded voltage range is a subset of a range of voltage requested by the sink.

13. A method for providing power, comprising:
    acquiring a request to provide voltage in a battery operated source;
    determining whether the voltage is to be supplied from a battery of the source;
    determining a bounded voltage range to supply to a sink according to the request and a voltage state of the battery, wherein the bounded voltage range comprises a maximum voltage value and a minimum voltage value to supply the sink determined based on an amount of discharge of the battery over a period of time;
    providing the bounded voltage range to the sink; and
    providing the bounded voltage range to the sink as long as the voltage state of the battery of the source remains above an empty state.

14. The method of claim 13, wherein the source is to determine the empty state according to the bounded voltage range.

15. The method of claim 13, wherein the bounded voltage range is negotiated with the sink.

\* \* \* \* \*